United States Patent
Le Pennec

(10) Patent No.: US 7,474,326 B2
(45) Date of Patent: Jan. 6, 2009

(54) INTER-NETWORK AND INTER-PROTOCOL VIDEO CONFERENCE PRIVACY METHOD, APPARATUS, AND COMPUTER PROGRAM PRODUCT

(75) Inventor: Thierry Le Pennec, Son (NO)

(73) Assignee: Tandberg Telecom AS, Lysaker (NO)

( * ) Notice: Subject to any disclaimer, the term of this patent is extended or adjusted under 35 U.S.C. 154(b) by 936 days.

(21) Appl. No.: 10/699,849

(22) Filed: Nov. 4, 2003

(65) Prior Publication Data

US 2004/0150712 A1    Aug. 5, 2004

Related U.S. Application Data

(60) Provisional application No. 60/423,393, filed on Nov. 4, 2002.

(51) Int. Cl.
*H04N 7/14*    (2006.01)
*H04K 1/10*    (2006.01)

(52) U.S. Cl. .............. 348/14.09; 348/14.08; 348/14.01; 370/260; 370/261

(58) Field of Classification Search ... 348/14.01–14.09, 348/14.12, 14.13, 14.1; 370/260, 261; 709/204; 380/37, 42, 277; 713/165, 167
See application file for complete search history.

(56) References Cited

U.S. PATENT DOCUMENTS

| | | | |
|---|---|---|---|
| 5,301,232 A * | 4/1994 | Mulford | 380/273 |
| 5,353,351 A | 10/1994 | Bartoli et al. | |
| 5,440,640 A | 8/1995 | Anshel et al. | |
| 5,500,899 A | 3/1996 | Snow | |
| 5,680,392 A * | 10/1997 | Semaan | 370/261 |
| 5,818,513 A | 10/1998 | Sano et al. | |
| 5,959,662 A | 9/1999 | Shaffer et al. | |
| 5,999,525 A | 12/1999 | Krishnaswamy et al. | |
| 5,999,966 A | 12/1999 | McDougall et al. | |
| 6,018,360 A | 1/2000 | Stewart et al. | |
| 6,124,882 A * | 9/2000 | Voois et al. | 348/14.08 |
| 6,211,902 B1 | 4/2001 | Tanoi | |
| 6,590,602 B1 * | 7/2003 | Fernandez et al. | 348/14.08 |
| 6,717,607 B1 * | 4/2004 | Lauper et al. | 348/14.08 |
| 6,981,022 B2 * | 12/2005 | Boundy | 709/204 |
| 7,076,067 B2 * | 7/2006 | Raike et al. | 380/277 |
| 2003/0091184 A1 | 5/2003 | Chui | |
| 2003/0142818 A1 * | 7/2003 | Raghunathan et al. | 380/1 |

FOREIGN PATENT DOCUMENTS

JP    408046723 A * 2/1996

OTHER PUBLICATIONS

M.J. Deville et al; 1994 IEEE Milcom "Interoperability Issues of Existing Collateral Video Teleconferencing Systems at the United States Pacific Command"; Military Communications Conference, 1994, milcom'94 Conference. Record, 1994 IEEE Fort Monmouth, NJ, USA Oct. 2-5, 1994, New York, NY, USA, IEEE, US, XP010149676.

* cited by examiner

*Primary Examiner*—Melur Ramakrishnaiah
(74) *Attorney, Agent, or Firm*—Oblon, Spivak, McClelland, Maier & Neustadt, P.C.

(57) ABSTRACT

A system, apparatus, method, and computer program product for establishing secure videoconferences between multiple nodes communicating via two or more transport protocols in which at least one encryption protocol is used.

78 Claims, 7 Drawing Sheets

INTER-NETWORK AND INTER-PROTOCOL VIDEO CONFERENCE PRIVACY METHOD, APPARATUS, AND COMPUTER PROGRAM PRODUCT

CROSS REFERENCE TO RELATED APPLICATIONS

The present patent application is related and claims priority to provisional U.S. application 60/423,393 filed on Nov. 4, 2002. The present application is also related to co-pending U.S. application Ser. No. 11/699,850, filed on the same day as the present application. The entire contents of both provisional U.S. application 60/423,393 and co-pending U.S. application Ser. No. 11/699,850 are incorporated herein by reference.

BACKGROUND OF THE INVENTION

1. Field of the Invention

This invention relates to systems, apparatuses, methods, and computer program products relating to establishing secure videoconferences between multiple nodes communicating via two or more transport protocols in which at least one encryption protocol is used.

2. Discussion of the Background

Video-conferencing is a ubiquitous form of the information exchange in the modern era. A video-conference includes at least two stations exchanging video, audio, and other data to support of a virtual meeting. The video is a stream of data made up of frames that include pictures and sound. Video signals are typically analog but may also be digital. The digital information may or may not be compressed.

Video conferencing is governed by a variety of international standards. Among standards that apply is H.320, the entire contents of which are hereby incorporated by reference. H.320 is a suite of standards documents defining video conferencing interoperability over ISDN. The H.320 standards define rules for establishing communications, framing, and synchronizing media, and inverse multiplexing ISDN channels. H.320 has several video and audio coding standards, including:

H.261—a video compression standard for bandwidth multiples of 64 Kbps;

H.263—an alternative video compression standard;

G.711—a standard for basic audio compression at 48 Kbps to 64 Kbps, and a low computation pulse code modulation technique used in regular telephony;

G.722—a standard for higher quality audio and bandwidths with more sophisticated audio processing; and G.728—a standard for lower bit rate audio compression at 16 Kbps.

Another international standard is H.323, the entire contents of which are hereby incorporated by reference. H.323 is a suite of standards documents defining interoperability of video conferencing over package switch networks, which may have no guaranteed quality of service (QoS). These standards define packetization and synchronization of media over packet switched networks and a gateway for interoperability of H.320 and H.323 systems. H.323 includes:

Essentially the same video compression standards used in H.320;

Essentially the same audio compression standards used in H.320;

An alternative international standard for packet switched networks is SIP, Session Initiation Protocol, the entire contents of which is incorporated herein by reference. SIP also includes essentially the same video and audio standards as H.320.

H.324, the entire contents of which are hereby incorporated by reference, is a suite of standards documents defining video conferencing interoperability over POTS, ISDN and Mobile networks (i.e., networks that include wireless communication links) that establishes multiplexing/control protocols and includes:

Essentially the same video compression standards used in H.320;

Essentially the same audio compression standards used in H.320;

T.120 is a suite of video conferencing data collaboration standards included in the three suites of standards described above. T.120, the entire contents of which are hereby incorporated by reference, includes:

T.124—a conference control standard;

T.126—a standard for sharing still images; and

T.127—a binary file transfer standard.

H.323 addresses computers and equipment that can carry real time video, audio and data or any combination of these elements. This standard is based on the Internet Engineering Task Force (IETF), Real Time Protocol (RTP) and Real Time Control Protocol (RTCP), with additional protocols for call signalling, and data and audio visual communications.

Currently it is possible to interface video teleconferencing equipment that operates over different protocols through a gateway device. A gateway is a network device that interconnects two different networks, thus enabling a call between two participants to pass from one network to another. A multi-protocol gateway device interconnects two or more calls originating on two or more different protocols or networks. FIG. 1 is a block diagram of a typical conventional multi-protocol video teleconferencing environment. A first terminal site 101 communicates with additional terminal sites 102 and 103 via an intermediary site, gateway/MCU site 104 which acts as a protocol converter. At the first site 101 a video teleconferencing device 1011 communicates its video conference information to the intermediary site's gateway device 1043. The intermediary site's gateway device 1043 translates from the first protocol to protocols used by the gateway devices 1021 and 1031 located at the other sites 102 and 103.

Examples of a multi-protocol gateway device 1043 are the Tandberg MCU and Tandberg 6000, which allow a terminal on an ISDN network to hold a video teleconference with a terminal on an IP network, and vice versa. Other products capable of this multi-protocol functionality are developed by Polycom, Ezenia, Radvision, and others. For clarity, a multipoint Control Unit (MCU) is a device configured to connect calls in a network so as to create a common "meeting room." A MCU builds a conference with several terminals and thus can broadcast composed images reflecting the meeting. In contrast to a conventional gateway, a MCU can also support other functionalities such as "Chair control" that delegates the control of the meeting to one of the terminals; "Request floor" that broadcasts, on request, the image send by one particular terminal; Broadcast and multicast, etc. The H.320 and H.323 standard series describe how an MCU operates.

Conventional multi-protocol devices are limited in their ability to provide security and protection of the data transmitted between sites. In particular, these devices cannot transmit across multiple links having different encryption standards. A general description of conventional secure video teleconferencing environment is found is found in FIG. 2. As in FIG. 1, a first videoconferencing site 101 communicates with other video conferencing sites 102 and 103 via an intermediary site, gateway/MCU site 104. The first site 101 has a teleconferencing unit 1011 with an embedded or attached encryption device 1011*a*. This teleconferencing unit 1011 communicates with a companion device 10411 at the intermediary site, gateway/MCU site 104. The companion device 10411 at the intermediary site, gateway/MCU site 104 includes an embedded or attached encryption device 10411*a* which is interoperable with the encryption device 1011*a* at the first site 101. Similarly, the intermediary site, gateway/MCU site 104 has video conferencing equipment and encryption devices 10421, 10421*a*, 10431, 10431*a* comparable to equipment and encryption devices at the second and third sites 1021, 1021*a*, 1031, and 1031*a*. The individual links are decrypted at the intermediary site, gateway/MCU site 104 and relayed via an unencrypted patch panel or local area network 1042 connecting the intermediary sites' videoconferencing devices 10411, 10421, 10431.

Conventional systems typically use commercially available encryption algorithms such as the Data Encryption Standard (DES), triple-DES, the Advanced Encryption Standard (AES), the International Data Encryption Algorithm (IDEA). Each of these commercial encryption algorithms and accompanying systems are documented in publicly available standards.

To set up a secure videoconference through a conventional MCU/GW using external encryption devices, it is necessary to install external devices on both ends of the connections between the terminal and the MCU/GW. In some cases, the encryption devices can handle several connections at a time. These encryption devices generally have the following characteristics:

They operate over a link-specific network protocol (ISDN, IP, etc.)

They require specific configurations (e.g., bandwidth, etc.)

They are general purposes and can also be used with faxes, telephones, and other communications equipment.

To initiate encryption, these devices can exchange keys (Diffie-Hellman, etc.) or use manual keys installed during the configuration.

For video-conferencing over ISDN links, each device must share the same protocols and algorithms to ensure compatibility. This implies that encryption devices come generally from the same company and the complete product is often a private solution. For video-conferencing over IP links, most of the devices use the IPsec protocol allowing a better interoperability between manufacturers. However, to provide videoconferencing privacy with MCU/GW isn't an "easy to use" solution and often it requires additional materials and highly trained installation and operations staff.

Conventional, secure, multi-protocol systems, as discovered by the present inventors, are plagued by unacceptable time delays between the various teleconferencing nodes, this method of interfacing encrypted video teleconferencing signals often is accompanied by unacceptable delays and confusion. Conventional systems are also not capable of complex key management, scheduling, and billing operations. As recognized by the present inventors, a solution to these problems would be an integrated videoconferencing capability that automatically connects at least two videoconferencing sites communicating via at least two transport protocols (e.g., ISDN and IP) and with at least one encryption protocol (e.g., DES, triple DES, AES, IDEA, etc.).

SUMMARY OF THE INVENTION

One object of the present invention is to provide equipment and processes that can affordably and efficiently establish and maintain secure videoconferences between sites that are communicating via two or more digital data transport protocols.

Another object of the present invention is to affordably provide security for hybrid H.320, H.323, H.324, and SIP videoconferencing environments. While certain protocols and networks are described herein, the present invention is not so limited. Rather, the present invention accommodates any communications protocol, even those not yet developed, since a protocol is merely a set of rules that govern the operation of functional units to achieve communication. Since the present invention employs processor-based devices, new protocols may easily be adapted through accommodation of a software and/or hardware update to accommodate the new protocol. Similarly, the present invention is not limited to interfacing to the specific communication networks described herein, but rather may be upgraded to interface with non-yet developed networks. This is possible because the present invention is software/hardware upgradeable, and since a communication network is merely a collection of interconnected functional units that provide a data communications service among stations attached to the network.

Another object of the present invention is to affordably provide security for T.120 video collaboration environments supported by a mixture of H.320, H.323, and H.324 videoconferencing environments. The present invention is not limited to the expressly mentioned standards or protocols, but may also operate on proprietary and future standards and networks, one example of which is Skinny Client Control Protocol (SCCP), developed by Cisco.

Another object of the present invention is to provide a method and corresponding computer program product directed to secure videoconferencing between sites that are communicating via two or more digital data transport protocols.

BRIEF DESCRIPTION OF THE DRAWINGS

A more complete appreciation of the present invention and many of the attendant advantages thereof will be readily obtained as the same becomes better understood by reference to the following detailed descriptions and accompanying drawings.

DETAILED DESCRIPTION OF THE PREFERRED EMBODIMENTS

Figure 1:
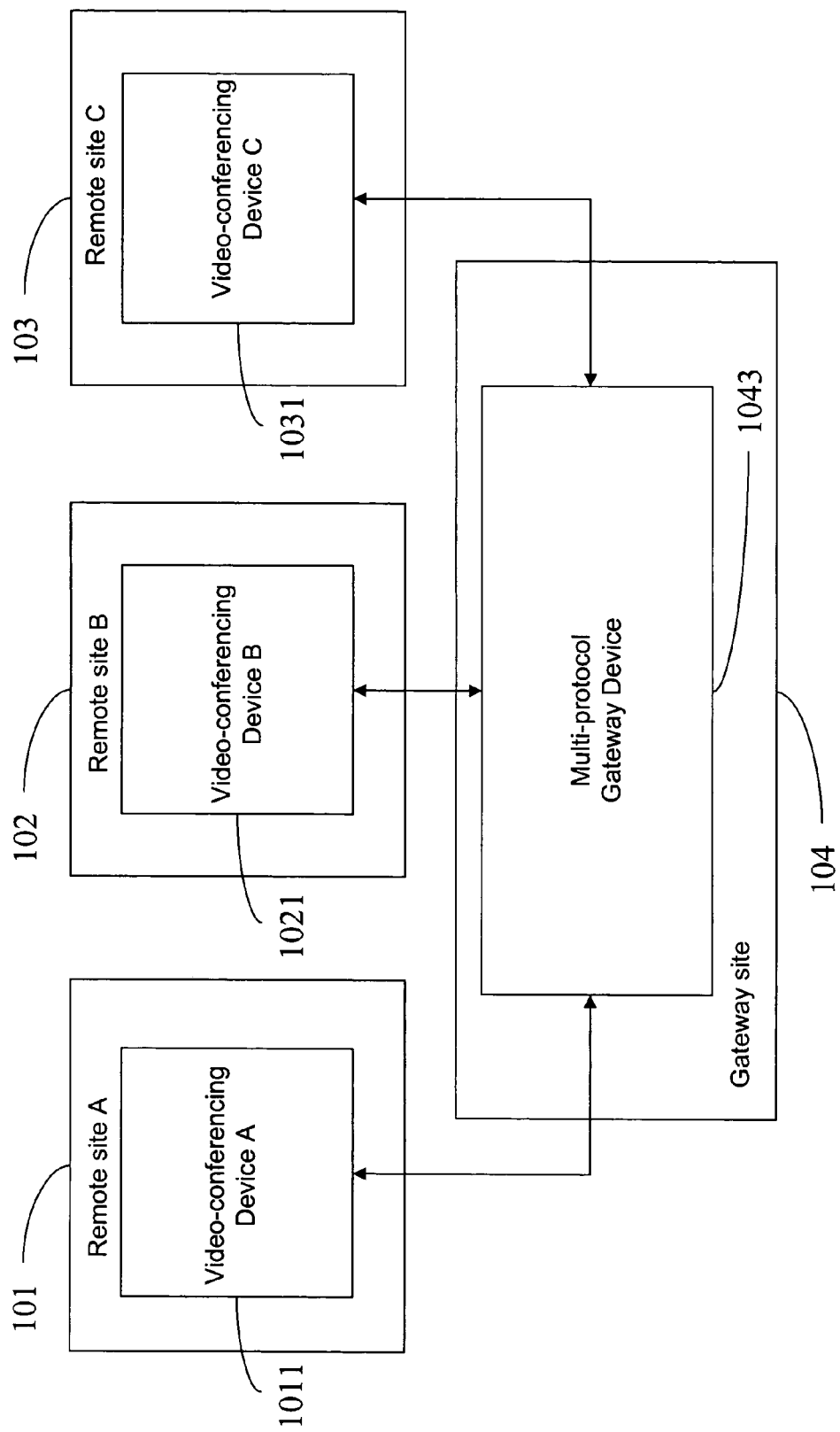
FIG. 1 is a block diagram of a conventional non-secure multi-protocol videoconferencing environment.
Figure 2:
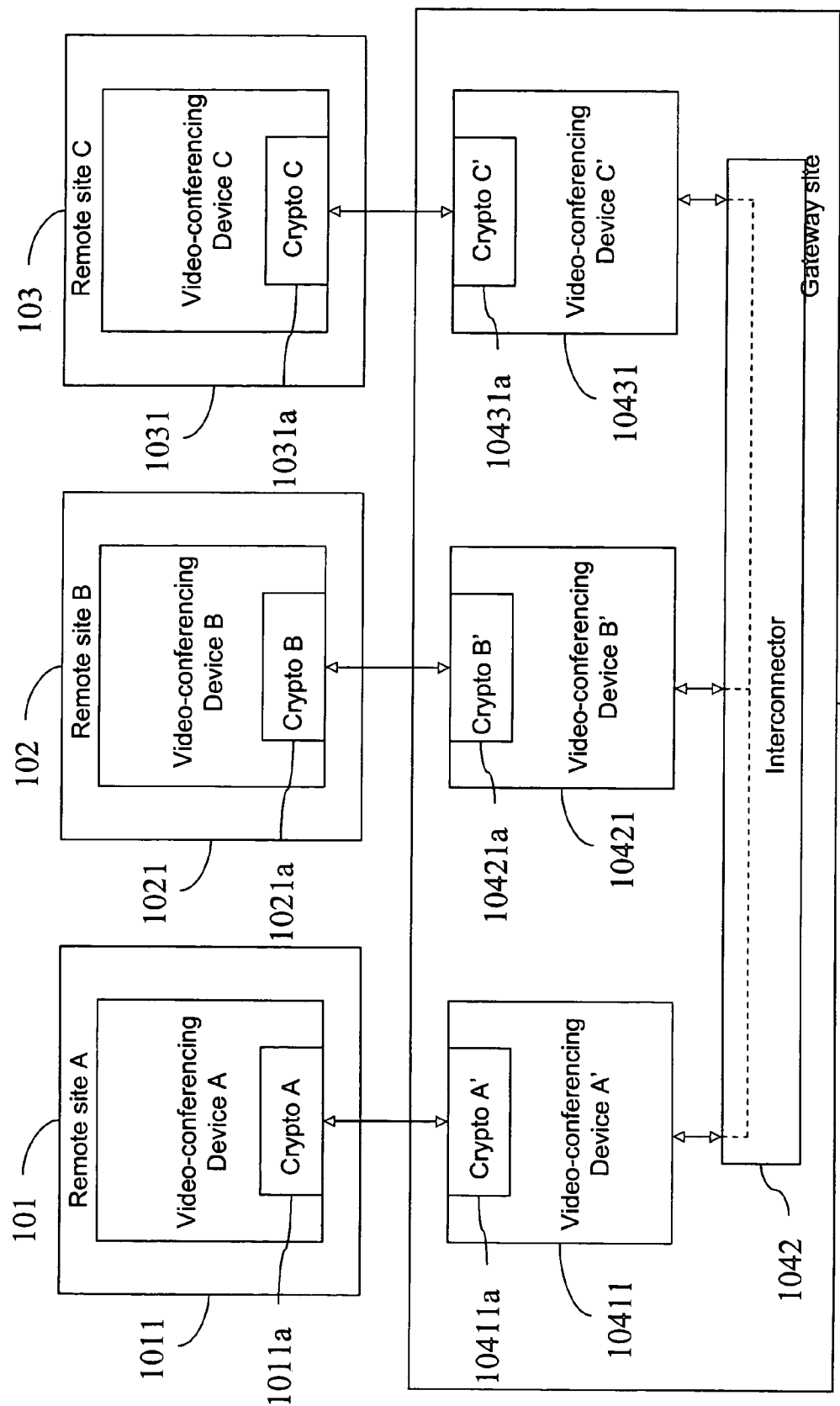
FIG. 2 is a block diagram of a conventional secure multi-protocol videoconferencing environment

The following comments relate to the drawings, wherein like reference numerals designate identical or corresponding parts throughout the several views.

Figure 3:
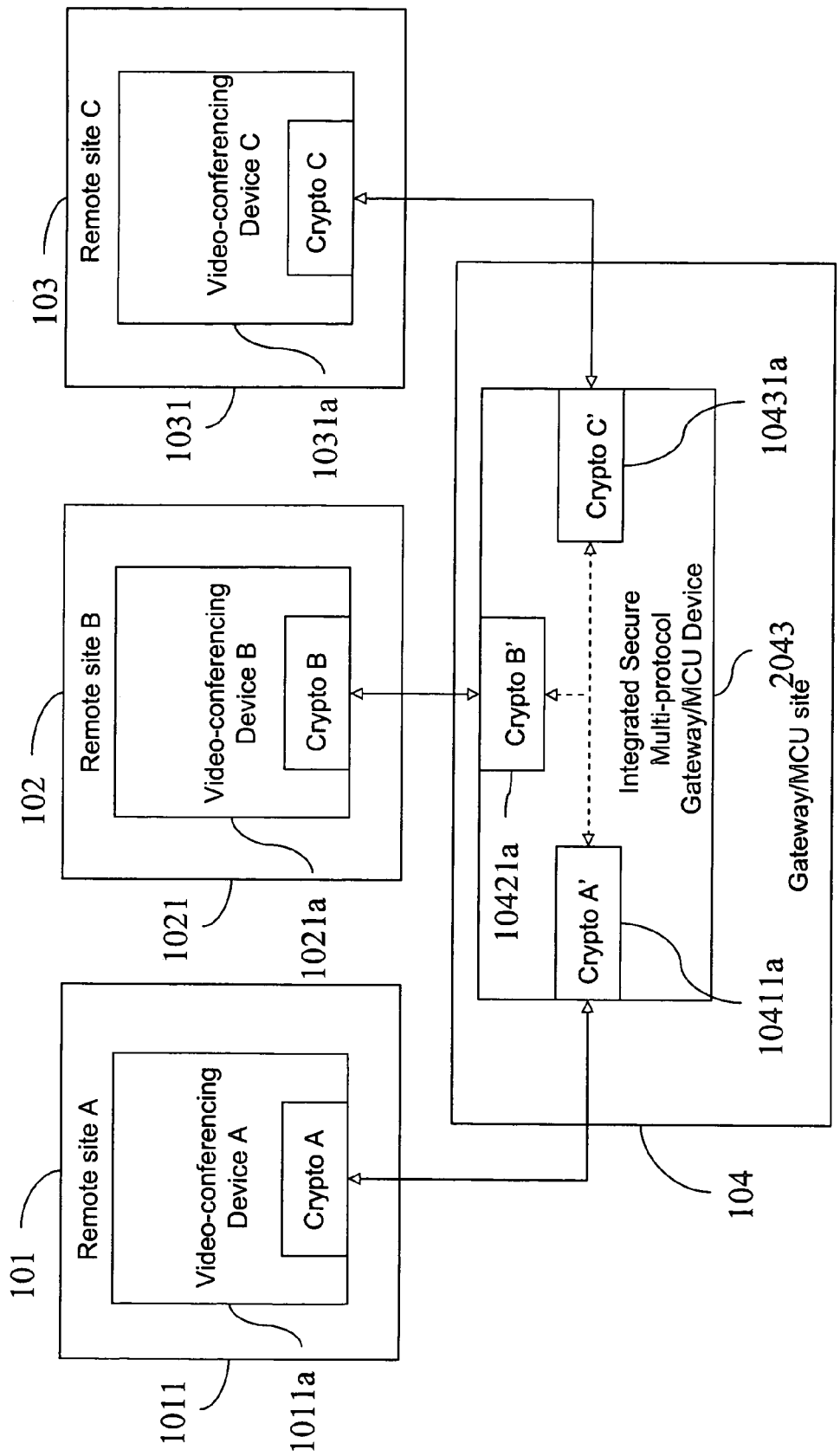
FIG. 3 is a block diagram of one embodiment of a real-time secure videoconferencing environment according to the present invention.

FIG. 3 is a block diagram of one embodiment of the present invention. The various videoconferencing sites 101, 102, and 103 communicate via an intermediary site, gateway/MCU site 104. At least two links to the intermediary site, gateway/MCU site 104 are via different digital data transport protocols (e.g., ISDN and IP). Each link is encrypted. The encryption standards used over the links may be the same or may be different. The integrated secure multi-protocol gateway/MCU device 2043 translates between transport protocols and encryption protocols in real time so as to ensure continuous communications without excessive delays between speakers. The encryption protocols used over an individual link may be a commercial encryption standard such as DES, triple-DES, AES, or IDEA. Keys may be exchanged via the Diffie-Helman protocol, RSA protocol, or another automatic key exchange protocol. A manual key exchange protocol may also be used. In addition, a local predetermined encryption algorithm may be used over one or more of the links. Each link may be encrypted with a different encryption protocol or a common encryption protocol with a different key. The secure gateway device may either interface to or embed the encryption devices 10411a, 10421a, and 10431a.

Figure 5:
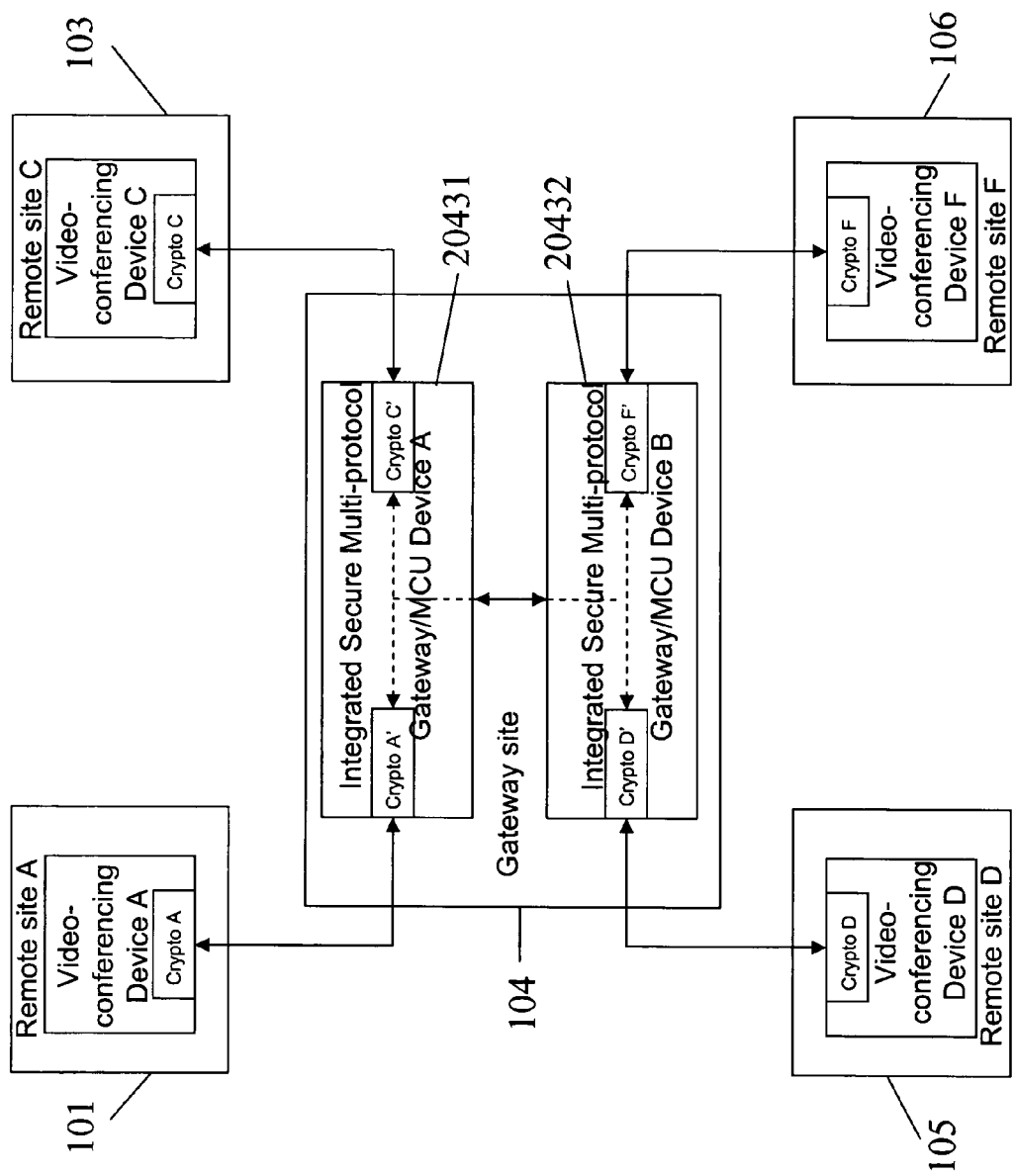
FIG. 5 is a block diagram of another embodiment of a real-time secure videoconferencing environment according to the present invention.

FIG. 3 shows an integrated secure multi-protocol gateway/MCU device 2043 connected to three terminal devices 1011, 1021, 1031. However, the present invention is not limited in the number of connections as expansion ports can allow for connections to four or more terminal devices. In an exemplary embodiment, the integrated secure multi-protocol gateway/MCU device 2043 handles more than three sites without expansion ports. FIG. 5 also shows an integrated secure multi-protocol gateway/MCU device 2043 housed at a third party facility, gateway/MCU site 104. However, in an alternative embodiment the integrated secure multi-protocol gateway/MCU device 2043 may be housed at one of the videoconferencing sites.

Figure 4:
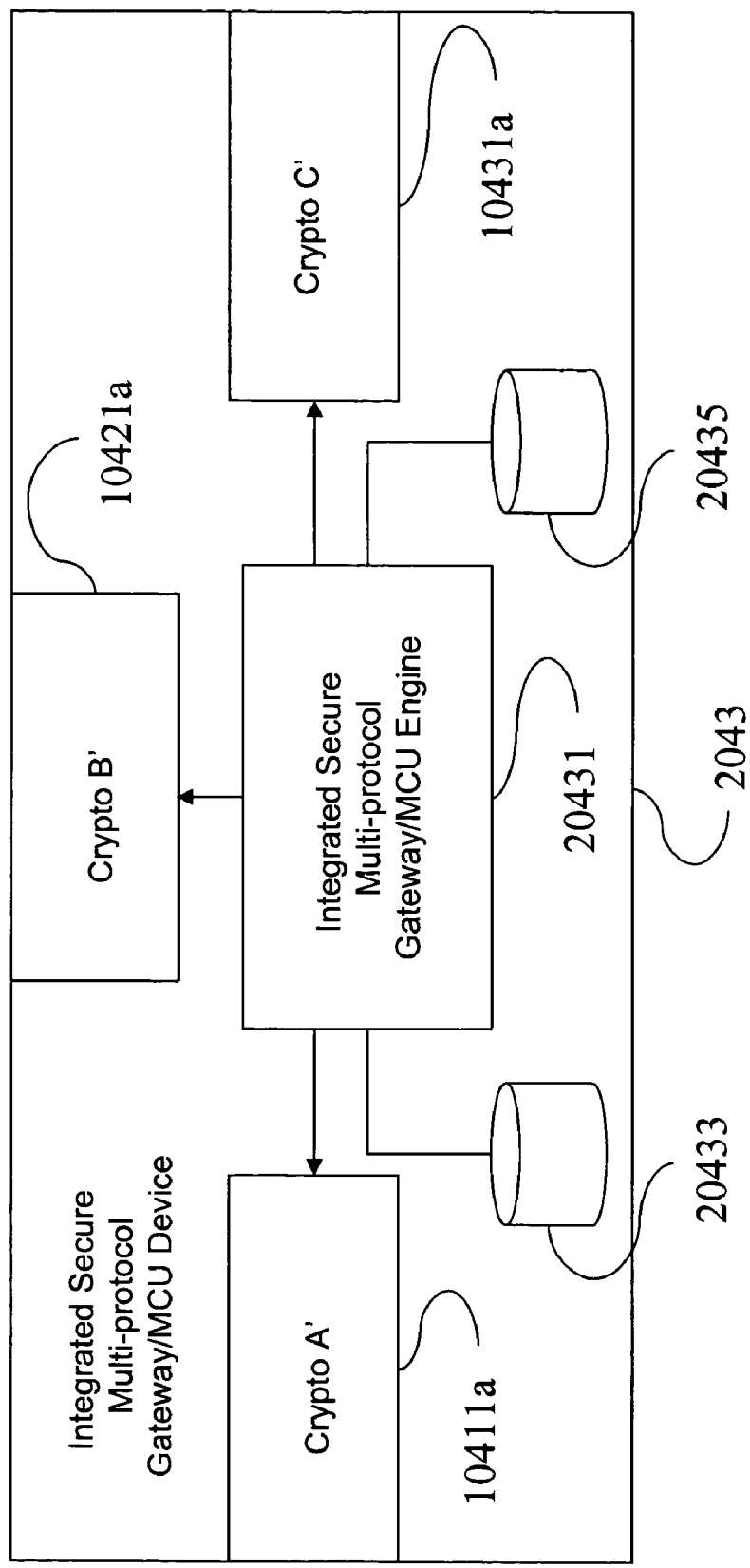
FIG. 4 is a block diagram of secure gateway device according to the present invention.

FIG. 4 is a block diagram showing details of the integrated secure multi-protocol gateway/MCU device 2043. In addition to encompassing or interfacing to the encryption devices 10411a, 10421a, and 10431a, the integrated secure multi-protocol gateway/MCU device 2043 includes a secure gateway engine 20431, a videoconferencing data buffer 20433 to buffer traffic so traffic flow can be managed, and a videoconferencing management data archive 20435 to hold encryption keys and management information, session history and diagnostic information and session scheduling and billing information. The secure gateway engine 20431 may support local or remote programming, scheduling, key management and synchronization, protocol management and synchronization, and billing.

One or more of the data types exchanged over the communications links (e.g., audio, video, and data) may be encrypted. The secure gateway engine 20431 also supports secure single site transmission modes (broadcast mode, multicast mode, etc.) as well as private key secure videoconferencing tunnelling over a link that is either unencrypted or is encrypted with a public key.

For convenience in describing an exemplary embodiment, the secure gateway/MCU engine 20431 includes an H.320 module, an H.323 module, a multi-point processor, multi-point controller, and multi-point controller encryption library. However, it should be understood that the secure gateway/MCU engine 20431 of the present invention may also be configured to support the SIP standard, in addition to, or in lieu of the other standards discussed herein. Nevertheless, for the present embodiment, the multi-point controller provides an abstract layer over the H.320 and H.323 modules. The multi-point controller controls the exchange of capabilities between the secure gateway engine 20431 and the various remote terminals according to the assigned link standard (e.g., H.320 or H.323). The multi-point controller establishes which encryption protocol (e.g., DES, IDEA, Triple DES, AES) is to be used. Incoming audio/video data is decrypted by the local encryption device and sent to the multi-point processor, which either mixes or switches the data depending the setting of a predetermined operational parameter. Outbound data is encrypted by the local encryption device and relayed to the multi-point processor for transmission to each external terminal. In this embodiment data encryption/decryption is performed at a lower level than the transport encoding (e.g., H320 or H323).

Operation of the secure gateway engine 20431 is predicated on communications with an appropriately configured remote terminal. For example, a remote H.320 capable ISDN terminal will ideally support H.233 and H.234 standards and an H.323 IP terminal will ideally support H.235. If the encryption standard used on a particular link is upgraded (e.g., a H.320 link is upgraded to be covered by an AES algorithm under H.233v2) then the corresponding encryption engine in the secure gateway engine 20431 will be upgraded by downloading a local or remote algorithm and keys into the multi-point controller encryption library.

FIG. 5 is a block diagram of another embodiment of the present invention where two secure gateway/MCU engines 20431 and 20432 are linked to provide an expanded secure videoconference network to four terminal sites 101, 103, 105, and 106. In another embodiment, three or more secure gateway engines are linked.

Figure 6:
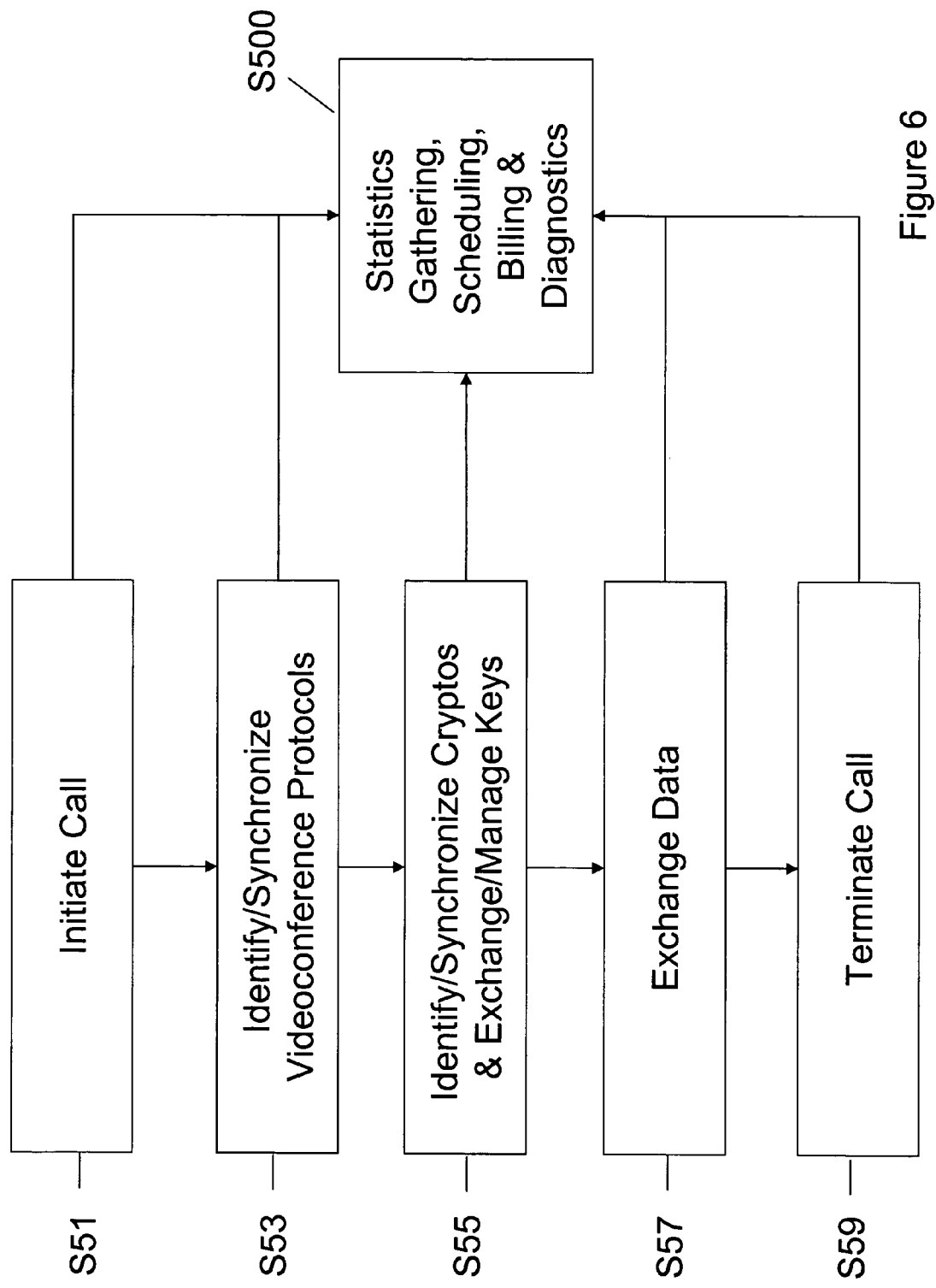
FIG. 6 is a flow chart of a method according to one embodiment of the present invention.

FIG. 6 is a flow chart of the method of secure multi-site, multi-protocol videoconferencing of the present invention. The process begins with one site (either a remote site or an intermediary site) initiating a call S51. Transport and videoconferencing protocols are identified and synchronized for this link. The encryption protocols are identified and synchronized S55. Optionally, keys are exchanged as well. Once the transport, videoconference, and encryption parameters are determined and the secure videoconferencing links are established, data is exchanged S57. At the end of a session, calls are terminated and the transport, videoconference, and encryption parameters are reset. Throughout this process, statistical data relative to scheduling, diagnostics and billing are gathered, one or more of which may exported to a remote site for processing.

In summary, to establish privacy on a peer session for a given network, the present invention uses an appropriate protocol to exchange keys and encryption algorithms for use with the terminal. For a terminal on an ISDN network, example protocols used by the present invention are ITU Recommendation H.233 and H.234. For a terminal on an IP network, example protocols used by the present invention include ITU Recommendation H.235.

In using these protocols, the present invention enables encryption key exchange keys (e.g., via the Diffie-Hellman algorithm) and operates with both private and commercial (e.g., DES) encryption algorithms.

In the present invention, the location of the encryptor and decryptor may vary depending on the standard in use. For example, under ISDN (H.320), starting from the physical layer, the encryptor and decryptor may be placed just above the multiplexer and demultiplexer layer. Under IP (H.323), the encryptor and decryptor may be placed just above the RTP stack.

When several peer sessions from different networks are set up through and with the present invention, these peer sessions can share data through the MCU/GW. The present invention will then decrypt data received from a terminal side and will encrypt data transmitted to the other side and vice-versa.

Among the many advantages with the present invention are:
- Less equipment is required to establish privacy among various links since the encryption devices may be built in the MCU/GW.
- The MCU/GW of the present invention is easier to configure than the conventional collection of equipment.
- The MCU/GW of the present invention is easier to maintain than the conventional collection of equipment.
- The MCU/GW of the present invention provides an integrated way to maintain interoperability between various transport and encryption standards and keys.

Figure 7:
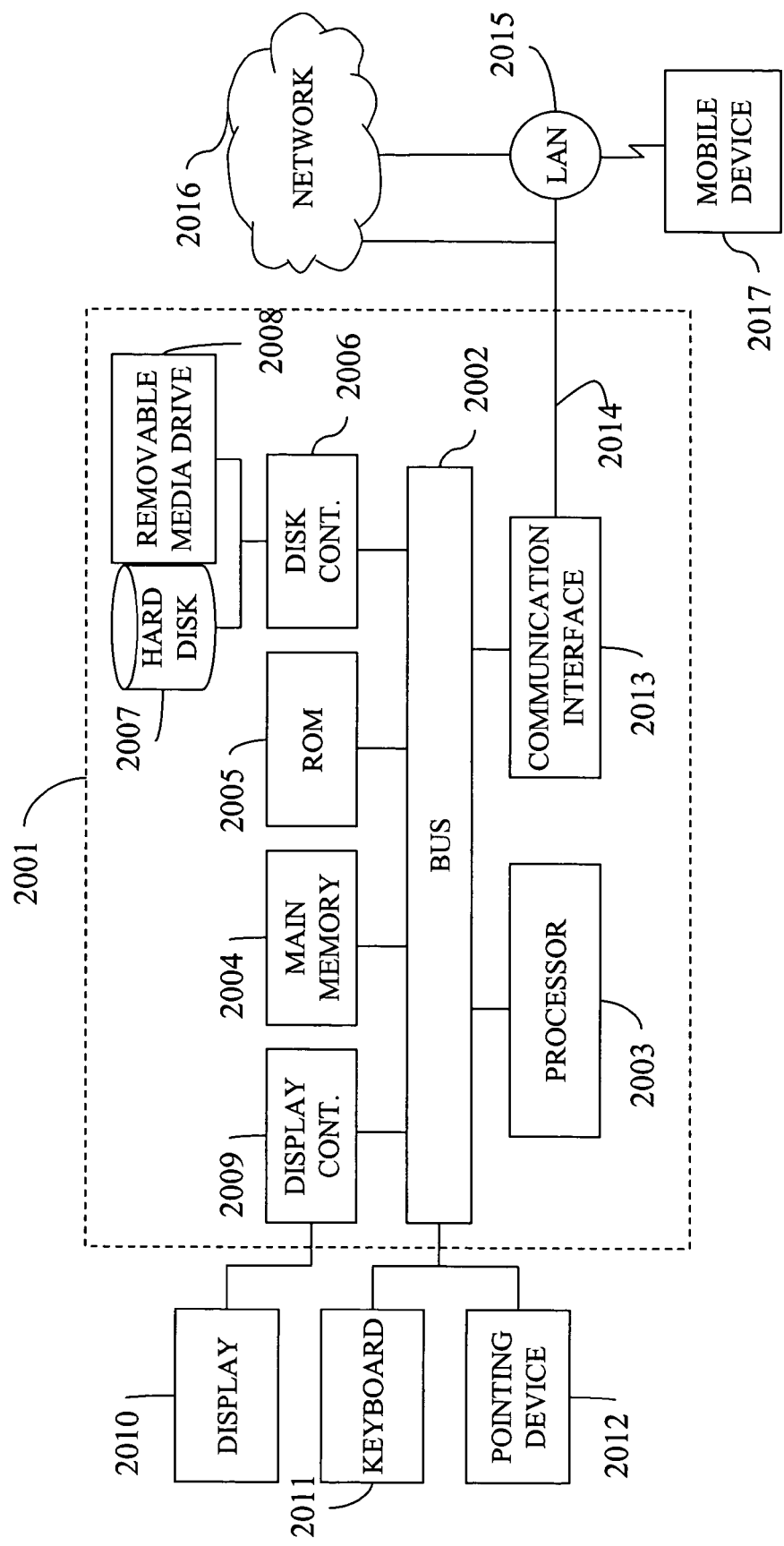
FIG. 7 is a block diagram of a computer associated with the present invention.

FIG. 7 is a block diagram of a computer system 2001 upon which an embodiment of the present invention may be implemented. It should be noted however, that the present system need not be based on a personal computer (PC) configuration, but rather a custom processor-based system (such as a software and/or hardware modified Tandberg 6000, or Tandberg MCU) that does not include the features of a general purpose computer may be used as well. Nevertheless, because the actual hardware configuration used to support the present invention, is not so restricted, an example of PC-based system is now provided. The computer system 2001 includes a bus 2002 or other communication mechanism for communicating information, and a processor 2003 coupled with the bus 2002 for processing the information. The computer system 2001 also includes a main memory 2004, such as a random access memory (RAM) or other dynamic storage device (e.g., dynamic RAM (DRAM), static RAM (SRAM), and synchronous DRAM (SDRAM)), coupled to the bus 2002 for storing information and instructions to be executed by processor 2003. In addition, the main memory 2004 may be used for storing temporary variables or other intermediate information during the execution of instructions by the processor 2003. The computer system 2001 further includes a read only memory (ROM) 2005 or other static storage device (e.g., programmable ROM (PROM), erasable PROM (EPROM), and electrically erasable PROM (EEPROM)) coupled to the bus 2002 for storing static information and instructions for the processor 2003.

The computer system 2001 also includes a disk controller 2006 coupled to the bus 2002 to control one or more storage devices for storing information and instructions, such as a magnetic hard disk 2007, and a removable media drive 2008 (e.g., floppy disk drive, read-only compact disc drive, read/write compact disc drive, compact disc jukebox, tape drive, and removable magneto-optical drive). The storage devices may be added to the computer system 2001 using an appropriate device interface (e.g., small computer system interface (SCSI), integrated device electronics (IDE), enhanced-IDE (E-IDE), direct memory access (DMA), or ultra-DMA).

The computer system 2001 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 2001 may also include a display controller 2009 coupled to the bus 2002 to control a display 2010, such as a cathode ray tube (CRT), for displaying information to a computer user. The computer system includes input devices, such as a keyboard 2011 and a pointing device 2012, for interacting with a computer user and providing information to the processor 2003. The pointing device 2012, for example, may be a mouse, a trackball, or a pointing stick for communicating direction information and command selections to the processor 2003 and for controlling cursor movement on the display 2010. In addition, a printer may provide printed listings of data stored and/or generated by the computer system 2001.

The computer system 2001 performs a portion or all of the processing steps of the invention in response to the processor 2003 executing one or more sequences of one or more instructions contained in a memory, such as the main memory 2004. Such instructions may be read into the main memory 2004 from another computer readable medium, such as a hard disk 2007 or a removable media drive 2008. One or more processors in a multi-processing arrangement may also be employed to execute the sequences of instructions contained in main memory 2004. In alternative embodiments, hard-wired circuitry may be used in place of or in combination with software instructions. Thus, embodiments are not limited to any specific combination of hardware circuitry and software.

As stated above, the computer system 2001 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 2001, for driving a device or devices for implementing the invention, and for enabling the computer system 2001 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 2003 for execution. A computer readable medium may take many forms, including but not limited to, non-volatile media, volatile media, and transmission media. Non-volatile media includes, for example, optical, magnetic disks, and magneto-optical disks, such as the hard disk 2007 or the removable media drive 2008. Volatile media includes dynamic memory, such as the main memory 2004. Transmission media includes coaxial cables, copper wire and fiber optics, including the wires that make up the bus 2002. Transmission media also may also take the form of acoustic or light waves, such as those generated during radio wave and infrared data communications.

Various forms of computer readable media may be involved in carrying out one or more sequences of one or more instructions to processor 2003 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 2001 may receive the data on the telephone line and use an infrared transmitter to convert the data to an infrared signal. An infrared detector coupled to the bus 2002 can receive the data carried in the infrared signal and place the data on the bus 2002. The bus 2002 carries the data to the main memory 2004, from which the processor 2003 retrieves and executes the instructions. The instructions received by the main memory 2004 may optionally be stored on storage device 2007 or 2008 either before or after execution by processor 2003.

The computer system 2001 also includes a communication interface 2013 coupled to the bus 2002. The communication interface 2013 provides a two-way data communication coupling to a network link 2014 that is connected to, for example, a local area network (LAN) 2015, or to another communications network 2016 such as the Internet. For example, the communication interface 2013 may be a network interface card to attach to any packet switched LAN. As another example, the communication interface 2013 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 2013 sends and receives electrical, electromagnetic or optical signals that carry digital data streams representing various types of information.

The network link 2014 typically provides data communication through one or more networks to other data devices. For example, the network link 2014 may provide a connection to another computer through a local network 2015 (e.g., a LAN) or through equipment operated by a service provider, which provides communication services through a communications network 2016. The local network 2014 and the communications network 2016 use, for example, electrical, electromagnetic, or optical signals that carry digital data streams, and the associated physical layer (e.g., CAT 5 cable, coaxial cable, optical fiber, etc). The signals through the various networks and the signals on the network link 2014 and through the communication interface 2013, which carry the digital data to and from the computer system 2001 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 2001 can transmit and receive data, including program code, through the network(s) 2015 and 2016, the network link 2014, and the communication interface 2013. Moreover, the network link 2014 may provide a connection through a LAN 2015 to a mobile device 2017 such as a personal digital assistant (PDA) laptop computer, or cellular telephone.

The present invention includes a user-friendly interface that allows individuals of varying skill levels to enter or retrieve transport, videoconferencing, or encryption parameters and management information. The interface allows users to optionally enable tunnelling or key exchange.

The present invention also includes software and computer programs designed to enable secure video-conferencing as described previously.

Obviously, numerous modifications and variations of the present invention are possible in light of the above teachings. It is therefore to be understood that within the scope of the appended claims, the invention may be practiced otherwise than as specifically described herein.

The invention claimed is:

1. A multi-protocol, videoconferencing interface device, comprising:
   at least three encryption devices, each encryption device configured to encrypt with a link-unique encryption key corresponding to one of a common encryption protocol and a link-unique encryption protocol;
   a secure interface connecting the at least three encryption devices, and configured to relay video and audio traffic between the at least three encryption devices during a common videoconferencing event;
   a videoconferencing data buffer connected to the secure interface and configured to buffer traffic relayed between the at least three encryption devices during the common videoconferencing event; and
   a videoconferencing management data archive connected to the secure interface and configured to hold the link-unique encryption keys, wherein
   said multi-protocol, videoconferencing interface device is one of a gateway device and a multi-point control unit (MCU) device.

2. The multi-protocol, videoconferencing interface device of claim 1, wherein the videoconferencing management data archive is further configured to store at least one of:
   a management information;
   a session history;
   a diagnostic information; and
   a session scheduling and billing information.

3. The multi-protocol, videoconferencing interface device of claim 1, wherein the secure interface comprises:
   a key management device.

4. The multi-protocol, videoconferencing interface device of claim 1, wherein the secure interface comprises:
   an encryption device programming device configured to enable one of local and remote encryption programming.

5. The multi-protocol, videoconferencing interface device of claim 1, wherein the secure interface comprises:
   a videoconference scheduling device.

6. The multi-protocol, videoconferencing interface device of claim 1, wherein the secure interface comprises:
   a key management and synchronization device.

7. The multi-protocol, videoconferencing interface device of claim 1, wherein the secure interface comprises:
   an encryption protocol management and synchronization device.

8. The multi-protocol, videoconferencing interface device of claim 1, wherein the secure interface comprises:
   a billing and account management device.

9. The multi-protocol, videoconferencing interface device of claim 1, wherein the secure interface comprises:
   a videoconferencing diagnostics device.

10. The multi-protocol, videoconferencing interface device of claim 1, wherein the secure interface engine comprises:

a communications protocol translator configured to translate between at least two link-unique communications protocols.

11. The multi-protocol, videoconferencing interface device of claim 10, wherein
a first of the at least two link-unique communications protocols comprises one of H.320, H.323, H.324, and T.120; and
a second of the of the at least two link-unique communications protocols comprises another of H.320, H.323, H.324, and T.120.

12. The multi-protocol, videoconferencing interface device of claim 1, wherein each of the link-unique encryption protocols comprises one of:
a manually provided encryption protocol;
a DES protocol;
a triple-DES protocol;
an AES protocol; and
an IDEA protocol.

13. The multi-protocol, videoconferencing interface device of claim 1, wherein at least one of the at least three encryption devices is configured to exchange keys via a key encryption protocol comprising one of:
an automatic key exchange protocol; and
a manual key exchange protocol.

14. The multi-protocol, videoconferencing interface device of claim 13, wherein the automatic key exchange protocol comprises one of:
a Diffie-Helman protocol; and
an RSA protocol.

15. A multi-protocol, videoconferencing interface device, comprising:
at least four encryption devices, each encryption device configured to encrypt with a link-unique encryption key corresponding to one of a common encryption protocol and a link-unique encryption protocol;
a first and a second secure interface engine connected to each other, connecting the at least four encryption devices, and configured to relay video and audio traffic between the at least four encryption devices during a common videoconferencing event;
a first and a second videoconferencing data buffer connected to the first and second secure interface engines, respectively, and configured to buffer traffic relayed between the at least four encryption devices during the common videoconferencing event; and
a first and a second videoconferencing management data archive connected to the first and the second secure interface engines, respectively, and configured to hold respective encryption keys, wherein
said multi-protocol, videoconferencing interface device is one of a gateway device and a multi-point control unit (MCU) device.

16. The multi-protocol, videoconferencing interface device of claim 15, wherein one of the first and second videoconferencing management data archives is further configured to store at least one of:
a management information;
a session history;
a diagnostic information; and
a session scheduling and billing information.

17. The multi-protocol, videoconferencing interface device of claim 15, wherein one of the first and second secure interface engines comprises:
a key management device.

18. The multi-protocol, videoconferencing interface device of claim 15, wherein one of the first and second secure interface engines comprises:
an encryption device programming device configured to enable one of local and remote encryption programming.

19. The multi-protocol, videoconferencing interface device of claim 15, wherein one of the first and second secure interface engine comprises:
a videoconference scheduling device.

20. The multi-protocol, videoconferencing interface device of claim 15, wherein one of the first and second secure interface engines comprises:
a key management and synchronization device.

21. The multi-protocol, videoconferencing interface device of claim 15, wherein one of the first and second secure interface engines comprises:
an encryption protocol management and synchronization device.

22. The multi-protocol, videoconferencing interface device of claim 15, wherein one of the first and secure interface engines comprises:
a billing and account management device.

23. The multi-protocol, videoconferencing interface device of claim 15, wherein one of the first and second secure interface engines comprises:
a videoconferencing diagnostics device.

24. The multi-protocol, videoconferencing interface device of claim 15, wherein one of the first and second secure interface engines comprises:
a communications protocol translator configured to translate between at least two link-unique communications protocols.

25. The multi-protocol, videoconferencing interface device of claim 24, wherein
a first of the at least two link-unique communications protocols comprises one of H.320, H.323, H.324, and T.120; and
a second of the of the at least two link-unique communications protocols comprises another of H.320, H.323, H.324, and T.120.

26. The multi-protocol, videoconferencing interface device of claim 15, wherein each of the link-unique encryption protocols comprises one of:
a manually provided encryption protocol;
a DES protocol;
a triple-DES protocol;
an AES protocol; and
an IDEA protocol.

27. The multi-protocol, videoconferencing interface device of claim 15, wherein at least one of the at least four encryption devices is configured to exchange keys via a key encryption protocol comprising one of:
an automatic key exchange protocol; and
a manual key exchange protocol.

28. The multi-protocol, videoconferencing interface device of claim 27, wherein the automatic key exchange protocol comprises one of:
a Diffie-Helman protocol; and
an RSA protocol.

29. A multi-protocol, videoconferencing interface system, comprising:
a first, second, and third videoconferencing node, each videoconferencing node including a node encryption device; and a multi-protocol, videoconferencing interface device connected to the first, second, and third videoconferencing nodes, and including
three interface encryption devices, each interface encryption device configured to encrypt with a link-unique encryption key corresponding to one of a common encryption protocol and a link-unique encryption protocol, the three interface encryption devices connected to a corresponding node encryption device;
a secure interface connecting the three encryption devices, and configured to relay video and audio traffic between the three encryption devices during a common videoconferencing event;
a videoconferencing data buffer connected to the secure interface and configured to buffer traffic relayed between the three encryption devices during the common videoconferencing event; and
a videoconferencing management data archive connected to the secure interface and configured to hold the link-unique encryption keys wherein
said multi-protocol, videoconferencing interface device is one of a gateway device and a multi-point control unit (MCU) device.

30. The multi-protocol, videoconferencing interface system of claim 29, wherein the secure interface comprises:
a key management device.

31. The multi-protocol, videoconferencing interface system of claim 29, wherein the secure interface comprises:
an encryption device programming device configured to enable one of local and remote encryption programming.

32. The multi-protocol, videoconferencing interface system of claim 29, wherein the secure interface comprises:
a videoconference scheduling device.

33. The multi-protocol, videoconferencing interface system of claim 29, wherein the secure interface comprises:
a key management and synchronization device.

34. The multi-protocol, videoconferencing interface system of claim 29, wherein the secure interface comprises:
an encryption protocol management and synchronization device.

35. The multi-protocol, videoconferencing interface system of claim 29, wherein the secure interface comprises:
a billing and account management device.

36. The multi-protocol, videoconferencing interface system of claim 29, wherein the secure interface comprises:
a videoconferencing diagnostics device.

37. The multi-protocol, videoconferencing interface system of claim 29, wherein the secure interface engine comprises:
a communications protocol translator configured to translate between at least two link-unique communications protocols.

38. A multi-protocol, videoconferencing interface system, comprising:
a first, second, third, and fourth videoconferencing node, each videoconferencing node including a node encryption device; and
a multi-protocol, videoconferencing interface device connected to the first, second, third, and fourth videoconferencing nodes, and including
four encryption devices, each encryption device configured to encrypt with a link-unique encryption key corresponding to one of a common encryption protocol and a link-unique encryption protocol, the four interface encryption devices connected to a corresponding node encryption device;
a first and a second secure interface engine connected to each other, connecting the four encryption devices, and configured to relay video and audio traffic between the four encryption devices during a common videoconferencing event;
a first and a second videoconferencing data buffer connected to the first and second secure interface engines, respectively, and configured to buffer traffic relayed between the four encryption devices during the common videoconferencing event; and
a first and a second videoconferencing management data archive connected to the first and the second secure interface engines, respectively, and configured to hold respective encryption keys wherein
said multi-protocol, videoconferencing interface device is one of a gateway device and a multi-point control unit (MCU) device.

39. The multi-protocol, videoconferencing interface system of claim 38, wherein one of the first and second secure interfaces comprises:
a key management device.

40. The multi-protocol, videoconferencing interface system of claim 38, wherein one of the first and second secure interfaces comprises:
an encryption device programming device configured to enable one of local and remote encryption programming.

41. The multi-protocol, videoconferencing interface system of claim 38, wherein one of the first and second secure interfaces comprises:
a videoconference scheduling device.

42. The multi-protocol, videoconferencing interface system of claim 38, wherein one of the first and second secure interfaces comprises:
a key management and synchronization device.

43. The multi-protocol, videoconferencing interface system of claim 38, wherein one of the first and second secure interfaces comprises:
an encryption protocol management and synchronization device.

44. The multi-protocol, videoconferencing interface system of claim 38, wherein one of the first and second secure interfaces comprises:
a billing and account management device.

45. The multi-protocol, videoconferencing interface system of claim 38, wherein one of the first and second secure interfaces comprises:
a videoconferencing diagnostics device.

46. The multi-protocol, videoconferencing interface system of claim 38, wherein one of the first and second secure interfaces comprises:
a communications protocol translator configured to translate between at least two link-unique communications protocols.

47. A method for secure, multi-protocol videoconferencing, comprising:
receiving at an interface device a first set of encrypted video data from a first terminal over a first data communications link including a first communications protocol;
decrypting the first set of video data at the interface device; and
re-encrypting and relaying the first set of data from the interface device to
a second terminal over a second communication link having a second communications protocol, the second communications protocol different from the first communications protocol, and
a third terminal over a third communication link having a third communications protocol.

48. The method of claim 47, wherein the third communications protocol comprises:
a communications protocol different from both the first and second communications protocols.

49. The method of claim 47, wherein the third communications protocol comprises:
a communications protocol the same as one of the first and second communications protocols.

50. The method of claim 47, wherein
the step of decrypting the first set of video data comprises decrypting with a first encryption key and a first encryption protocol, and
the step of re-encrypting and sending the first set of video data to the second terminal comprises encrypting the first set of video data with a second encryption key and a second encryption protocol, the second encryption key different from the first encryption key and the second encryption protocol different from the first encryption protocol.

51. The method of claim 50, wherein the step of re-encrypting and sending the first set of video data to the third terminal further comprises:
encrypting the first set of video data with a third encryption key and a third encryption protocol, the third encryption key different from the first and second encryption keys and the third encryption protocol different from the first and second encryption protocols.

52. The method of claim 50, wherein the step of re-encrypting and sending the first set of video data to the third terminal further comprises:
encrypting the first set of video data with a third encryption key and a third encryption protocol, the third encryption key being different from the first and second encryption keys and the third encryption protocol being the same as one of the first and second encryption protocols.

53. The method of claim 50, wherein the step of re-encrypting and sending the first set of video data to the third terminal further comprises:
encrypting the first set of video data with a third encryption key and a third encryption protocol, the third encryption key being the same as one of the first and second encryption keys and the third encryption protocol being the same as a corresponding one of the first and second encryption protocols.

54. The method of claim 47, wherein
the step of decrypting the first set of video data comprises decrypting with a first encryption key and a first encryption protocol, and
the step of re-encrypting and sending the first set of video data to the second terminal comprises encrypting with a second encryption key and a second encryption protocol, the second encryption key different from the first encryption key and the second encryption protocol the same as the first encryption protocol.

55. The method of claim 54, wherein the step of re-encrypting and sending the first set of video data to the third terminal further comprises:
encrypting the first set of video data with a third encryption key and a third encryption protocol, the third encryption key different from the first and second encryption keys and the third encryption protocol different from the first and second encryption protocols.

56. The method of claim 54, wherein the step of re-encrypting and sending the first set of video data to the third terminal further comprises:
encrypting the first set of video data with a third encryption key and a third encryption protocol, the third encryption key being different from the first and second encryption keys and the third encryption protocol being the same as one of the first and second encryption protocols.

57. The method of claim 47, further comprising:
receiving at the interface device a second set of encrypted video data from the second terminal over the second data communication link;
decrypting the second set of video data at the interface device with a second key and a second encryption protocol; and
re-encrypting and relaying the second set of data from the interface device to the first terminal and the third terminal via the first and third communications links, respectively.

58. The method of claim 57, wherein the third communications protocol comprises:
a communications protocol different from both the first and second communications protocols.

59. The method of claim 57, wherein the third communications protocol comprises:
a communications protocol the same as one of the first and second communications protocols.

60. The method of claim 57, wherein
the step of decrypting the second set of video data comprises decrypting with a second encryption key and a second encryption protocol, and
the step of re-encrypting and sending the second set of video data to the first terminal comprises encrypting with the first encryption key and the first encryption protocol, the second encryption key different from the first encryption key and the second encryption protocol different from the first encryption protocol.

61. The method of claim 60, wherein the step of re-encrypting and sending the second set of video data to the third terminal further comprises:
encrypting with a third encryption key and a third encryption protocol, the third encryption key different from the first and second encryption keys and the third encryption protocol different from the first and second encryption protocols.

62. The method of claim 60, wherein the step of re-encrypting and sending the second set of video data to the third terminal further comprises:
encrypting with a third encryption key and a third encryption protocol, the third encryption key being different from the first and second encryption keys and the third encryption protocol being the same as one of the first and second encryption protocols.

63. The method of claim 60, wherein the step of re-encrypting and sending the second set of video data to the third terminal further comprises:
encrypting with a third encryption key and a third encryption protocol, the third encryption key being the same as one of the first and second encryption keys and the third encryption protocol being the same as a corresponding one of the first and second encryption protocols.

64. The method of claim 57, wherein
the step of re-encrypting and sending the second set of video data to the first terminal comprises encrypting with a first encryption key and a first encryption protocol, the second encryption key different from the first encryption key and the second encryption protocol the same as the first encryption protocol.

65. The method of claim 64, wherein the step of re-encrypting and sending the second set of video data to the third terminal further comprises:
encrypting with a third encryption key and a third encryption protocol, the third encryption key different from the first and second encryption keys and the third encryption protocol different from the first and second encryption protocols.

66. The method of claim 64, wherein the step of re-encrypting and sending the second set of video data to the third terminal further comprises:
encrypting with a third encryption key and a third encryption protocol, the third encryption key being different from the first and second encryption keys and the third encryption protocol being the same as one of the first and second encryption protocols.

67. The method of claim 57, further comprising:
receiving at the interface device a third set of encrypted video data from the third terminal over the third data communication link;
decrypting the third set of video data at the interface device with a third encryption key and a third encryption protocol; and
re-encrypting and relaying the third set of data from the interface device to the first and second terminals over the first and second communication links, respectively.

68. The method of claim 67, wherein the third communication protocol comprises:
a communications protocol different from the first and second communications protocols.

69. The method of claim 67, wherein the third communication protocol comprises:
a communications protocol the same as one of the first and second communications protocols.

70. The method of claim 67, wherein
the step of re-encrypting and sending the third set of video data to the first terminal comprises encrypting with a first encryption key and a first encryption protocol,
the step of re-encrypting and sending the third set of video data to the second terminal comprises encrypting with a second encryption key and a second encryption protocol, the second encryption key different from the first encryption key and the second encryption protocol different from the first encryption protocol.

71. The method of claim 70, wherein the step of decrypting with a third encryption key and a third encryption protocol comprises:
decrypting with a third encryption key different from the first and second encryption keys and with a third encryption protocol different from the first and second encryption protocols.

72. The method of claim 70, wherein the step of decrypting with a third encryption key and a third encryption protocol comprises:
decrypting with a third encryption key different from the first and second encryption keys and with a third encryption protocol the same as one of the first and second encryption protocols.

73. The method of claim 70, wherein the step of decrypting with a third encryption key and a third encryption protocol comprises:
decrypting with a third encryption key the same as one of the first and second encryption keys and a third encryption protocol the same as a corresponding one of the first and second encryption protocols.

74. The method of claim 67, wherein
the step of re-encrypting and sending the third set of video data to the first terminal comprises encrypting with a first encryption key and a first encryption protocol, and
the step of re-encrypting and sending the third set of video data to the second terminal comprises encrypting with a second encryption key different from the first encryption key and a second encryption protocol the same as the first encryption protocol.

75. The method of claim 74, wherein the step of decrypting with a third encryption key and a third encryption protocol comprises:
decrypting with a third encryption key different from the first and second encryption keys and with a third encryption protocol different from the first and second encryption protocols.

76. The method of claim 74, wherein the step of decrypting with a third encryption key and a third encryption protocol comprises:
decrypting with a third encryption key different from the first and second encryption keys and with a third encryption protocol the same as one of the first and second encryption protocols.

77. A system for secure, multi-protocol videoconferencing, comprising:
means for receiving at an interface device a first set of encrypted video data from a first terminal over a first data communications link including a first communications protocol;
means for decrypting the first set of video data at the interface device; and
means for re-encrypting and relaying the first set of data from the interface device to
a second terminal over a second communication link having a second communications protocol, the second communications protocol different from the first communications protocol, and
a third terminal over a third communication link having a third communications protocol.

78. A computer program product configured to store instructions corresponding to any one of the methods of claims 47-76.

* * * * *